3,543,142
COMPENSATING CIRCUIT FOR
CAPACITOR LOSSES
Günter Haussmann and Klaus-Wilhelm Müller, Constance,
Germany, assignors to Telefunken Patentverwertungsgesellschaft m.b.H., Ulm (Danube), Germany
Filed Apr. 4, 1968, Ser. No. 718,861
Claims priority, application Germany, Apr. 7, 1967,
T 33,613
Int. Cl. G05f 1/10
U.S. Cl. 323—66                                    10 Claims

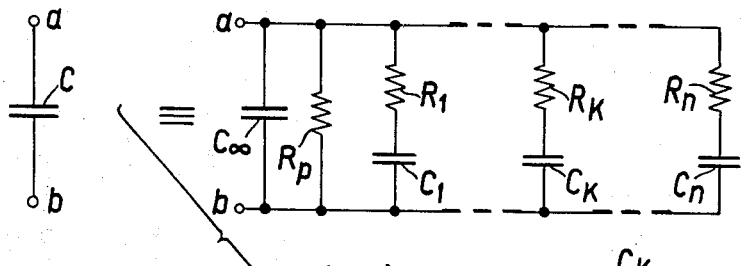
Fig. 1a
Fig. 1b
$$C(j\omega) = C_\infty + \sum_K \frac{C_K}{1+j\omega R_K C_K}$$
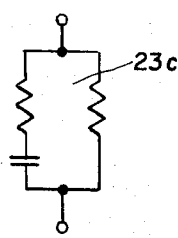
Fig. 5
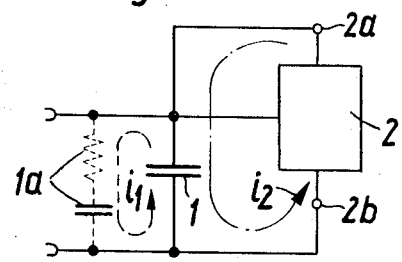
Fig. 2
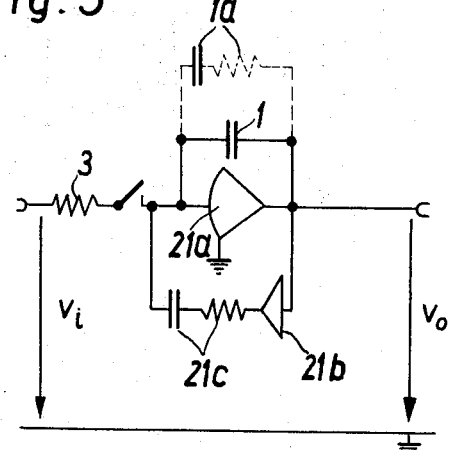
Fig. 3a
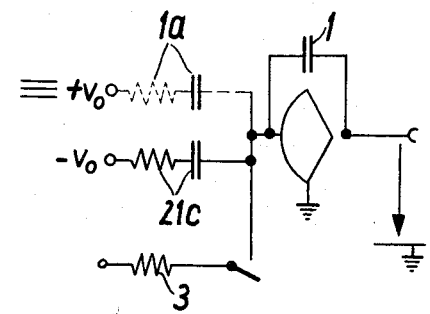
Fig. 3b
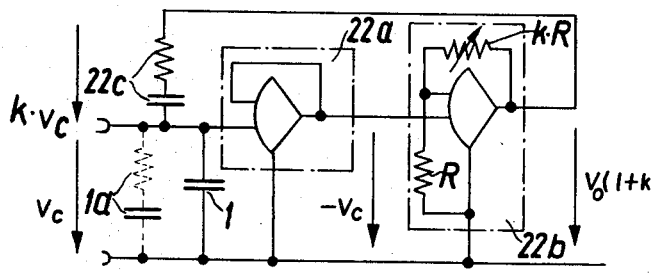
Fig. 4a
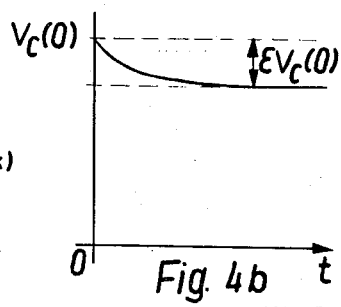
Fig. 4b
INVENTORS
Günter Haussmann &
Klaus-Wilhelm Müller

United States Patent Office 3,543,142
Patented Nov. 24, 1970

ABSTRACT OF THE DISCLOSURE

A two-terminal circuit connected as an equalizing device in an integrator composed of an amplifier and a capacitor forming a feedback loop for the amplifier, to compensate for the losses due to dielectric absorption in the integrating capacitor. The network is connected across the capacitor to receive a signal from the capacitor and to supply the capacitor with a current whose amplitude characteristic is chosen so as to compensate for the voltage changes produced by the dielectric absorption.

BACKGROUND OF THE INVENTION

The present invention relates to a circuit for equalizing the losses in a capacitor caused by dielectric absorption.

The effect of dielectric absorption upon capacitors is described in the article "An Analysis of Certain Errors in Electronic Differential Analyzers" in IRE Transactions on Electronic Computers (1958), pp. 17–22. An equivalent circuit of a capacitor which takes the dielectric absorption effect into account is shown schematically in FIG. 1b. The real capacitor C shown in FIG. 1a, as represented by the equivalent circuit in FIG. 1b, comprises an ideal capacitor $C\infty$ arranged in parallel with a resistor $R_p$ which characterizes the leakage losses and, in addition, a plurality of RC elements, $R_1 C_1 \ldots R_k C_k \ldots R_n C_n$. The RC elements characterize the losses in the capacitotr C caused by dielectric absorption.

The frequency dependence of the capacitance of the real capacitor is set forth in FIG. 1b below the equivalent circuit. This function breaks down into a frequency-independent real part and a frequency-dependent imaginary part. The leakage resistance $R_p$ is not taken into account in this equation.

The dielectric absorption represented in the equivalent circuit by the parallel RC elements affects the transient response of the real capacitor C in the following manner. If a pulse having a definite voltage value and a width which is less than the smallest of the time constants $R_k C_k$ is applied to the real capacitor C, the voltage across the capacitor will decrease slightly after the pulse has ended. This decrease is due to the fact that the capacitors of the RC elements, which, because of their longer time constants, are only partly charged, extract or absorb charge from the capacitor C until all the capacitors in the equivalent circuit assume the same voltage. For certain types of real capacitors it has been found, for example, that the ultimate capacitor voltage represents a decrease from the charging voltage of one part in a thousand.

If these types of capacitors are used in precision analogue computers, as storage elements for example, this kind of voltage error produced by dielectric absorption (variations in the capacitor dielectric constants) is not acceptable.

There are, in fact, capacitors for which the dielectric absorption losses are so small that they could be disregarded even when the capacitors were used in analogue computers. However, these capacitors exhibit such relatively high temperature coefficients that they also can not be used, in practice, as precision analogue storage elements. Due to the effects of dielectric absorption, all the capacitors available at this time which have low temperature coefficients are characterized by error in the order of magnitude noted above.

SUMMARY OF THE INVENTION

An object of the present invention therefore is to provide means by which capacitors which exhibit losses as a result of dielectric absorption can be employed as analogue storage or analogue calculating elements.

This, as well as other objects, which will become apparent in the discussion that follows, is achieved, according to the present invention, by connecting a circuit across the capacitor which substantially equalizes the dielectric absorption losses. This circuit detects the capacitor voltage and supplies the capacitor with a current having an amplitude characteristic that causes the voltage changes produced by the dielectric absorption to be equalized.

In a preferred embodiment of the present invention, the circuit includes a two-pole capacitor-resistor combination which has the same time constant and the voltage changes to be equalized.

In a further preferred embodiment of the present invention, the circuit includes means for applying a voltage to the capacitor-resistor combination so that the current supplied to the capacitor to be equalized will approximately equal the internal capacitor loss produced by dielectric absorption.

BRIEF DESCRIPTION OF THE DRAWING

FIG. 1a is a schematic diagram of a real capacitor.

FIG. 1b is a schematic diagram of the equivalent circuit of the capacitor of FIG. 1a.

FIG. 2 is a schematic diagram of a capacitor together with the means for equalizing the losses produced by dielectric absorption, according to the present invention.

FIG. 3a is a schematic diagram of a capacitor which is connected in an analogue integration circuit. It is provided with means, according to a preferred embodiment of the present invention, for equalizing the losses produced by dielectric absorption.

FIG. 3b is a schematic diagram of an equivalent circuit of the circuit of FIG. 3a.

FIG. 4a is a schematic diagram of a capacitor, compensated by a circuit according to another preferred embodiment of the present invention, which can be inserted as a measuring or storage capacitor between arbitrary points of a general network.

FIG. 4b is a graph showing the transient response of the capacitor of FIG. 4a without the compensating circuit.

FIG. 5 is a schematic diagram of a feedback circuit which may be used to equalize both the dielectric absorption and the leakage losses of a capacitor, in accordance with still another preferred embodiment of the present invention.

DESCRIPTION OF THE PREFERRED EMBODIMENTS

Reference is now made to FIG. 2 which illustrates the operation of the circuit according to the present invention.

The circuit of FIG. 2 includes a real capacitor 1 which is subject to losses due to dielectric absorption and a circuit 2 for equalizing these losses. An RC element 1a, drawn in dashed lines, is included in the circuit after the model of FIG. 1b and represents the dielectric absorption losses of the capacitor. If the capacitor 1 is charged to a prescribed voltage for a time which is shorter than the time constant of the RC element $1a$, after the charging voltage source is removed, the capacitor of the RC element $1a$ will draw a charge from the capacitor 1 by means of the current $i_1$ until both capacitors reach the same potential. The circuit 2 produces from the voltage on the capacitor $1a$ current $i_2$ which is led from the output terminal $2a$ through the capacitor 1 back to the input terminal $2b$ of the circuit. If the current $i_2$ equals the current $i_1$ at every instant, the charge delivered to the capacitor will be just equal to the charge taken away by the RC element $1a$. The result is that the voltage across the capacitor 1 will remain equal to the prescribed voltage of the charging pulse. The operation of the circuit 2 can also be viewed in another way. The current $i_2$ produced by the circuit 2 may be considered to flow directly through the capacitor of the RC element $1a$ to provide the necessary charge therefor to thereby achieve the same effect.

Since it is necessary that $i_2(t) = i_1(t)$, where $t$ is time, it is necessary to know the quantitative values of the various capacitors employed in the equivalent circuit of FIG. $1b$. A method of determining the actual values for the elements of the equivalent circuit is known in the art and is described in the article "An Analysis of Certain Errors in Electronic Differential Analyzers," supra.

FIG. $3a$ shows an analogue integrator which comprises an analogue D.C. or operational amplifier $21a$ having capacitive feedback. The amplifier is in series with a switch and with a resistor 3 which receives the input voltage $v_1$ to be integrated. The capacitor which provides the feedback is subject to losses of the type described above in connection with FIG. 2. For this reason, and to make the circuit more easily understandable, this capacitor is again designated with the numeral 1. The equivalent circuit which describes the capacitor losses is also indicated in dashed lines by an RC element $1a$ parallel to the capacitor 1, as in FIG. 2. To prevent the output voltage $v_0$ of the integrator in its storage phase—that is, when the switch which lies in its input circuit is open— from decreasing due to the dielectric absorption losses of the capacitor 1, the amplifier $21a$ is provided with an additional feedback branch, in accordance with the present invention, which compensates these losses. This feedback branch comprises an analogue phase-reversing amplifier $21b$ connected to the output of the amplifier $21a$ and an RC series element $21c$ interconnecting the output of the amplifier $21b$ and the input of the operational amplifier $21a$. The resistance and capacitance values of the RC element $21c$ must be chosen to match the corresponding values of the RC element $1a$ which describes the capacitor losses. If a single RC element $1a$ is not sufficient to describe the losses of the capacitor 1—if a plurality of RC elements of differing time constants must be assumed in the manner of the equivalent circuit shown in FIG. $1b$—an identical combination of RC elements must be employed in place of the single RC element $21c$.

The circuit of FIG. $3a$ is shown again in FIG. $3b$; it has been transformed, however, to make the operation of the circuit easier to understand. The RC element $21c$, in FIG. $3b$, is connected as an input element with an input voltage $-v_0$; the (imaginary) RC element $1a$ is connected as an input element with an input voltage $+v_0$. Since both of these RC elements have the same parameters and since both voltages have opposite signs, their point of connection at the input of the operational amplifier will exhibit zero potential at all times during the equalization process. The capacitor 1 will therefore experience no voltage decrease due to dielectric absorption when the input switch is open.

The impedance of the RC element $21c$ can, if necessary, be made higher or lower than that of the RC element $1a$. Correspondingly then, the voltage applied to the RC element $21c$ via the amplifier $21b$ must be made smaller or larger, respectively, to achieve the desired effect of charge equalization.

In FIG. $4a$ the capacitor 1, which is subject to the dielectric absorption losses, is connected across the input of an isolating aplifier $22a$. The output of this amplifier is connected, in turn, to the input of a potentiometric amplifier $22b$ which has a gain $g_b = -(1+k)$. The isolating amplifier $22a$ has a voltage gain $g_a = -1$ and a high impedance input. Both types of amplifiers are known in the art and are described, for example, in the article "Grundschaltungen von Gleichspannungsverstärkern in der Messwertverarbeitung," International Elektronische Rundschau, No. 7 (1963), pp. 341–344.

The output voltage of the potentiometric amplifier $22b$ is led back through an RC element $22c$ to the input of the isolating amplifier $22a$. The parameters of the RC element $22c$ are chosen in the same way as the parameters of the RC element $21c$ of FIG. $3a$—that is, they are preferably made identical with the parameters of the RC element $1a$. To achieve the desired compensation of the charge losses in the capacitor 1 it is simplest, in practice, to make variable the feedback resistor of the potentiometric amplifier $22b$. This permits the point of equalization to be found empirically through adjustment of the gain of this amplifier. The constant $k$ which appears in the amplification factor of the potentiometric amplifier $22b$ may be calculated from the following expression:

$$k = \frac{(C_0 + C_1)\epsilon}{C_1}$$

$C_0$ is the ideal value of the capacitor 1 and corresponds to the value $C_\infty$ in the equivalent circuit of FIG. $1b$. $C_1$ is the capacity of the RC element $1a$ of the circuit of FIG. $4a$ which characterizes the dielectric absorption losses and lies parallel with the capacitor 1. $C_1$ also corresponds to the capacity of the RC element $22c$. The value $\epsilon$ may be obtained from FIG. $4b$.

FIG. $4b$ is a graph of the time dependence of the voltage appearing across a real capacitor 1 which has been charged by a short pulse to a voltage $V_c(0)$. The dielectric absorption losses effect a reduction of the capacitor voltage by a value $\epsilon V_c(0)$. This value may be easily determined by empirical measurements. Although the calculation of the value $k$ in accordance with the expression given above is only exact in the case where the capacitor losses may be approximated by the parallel connection of only a single RC element, the expression yields sufficiently accurate results for the other cases as well.

The parameters of the RC element $22c$ can be chosen smaller or larger than the RC element $1a$. The gain of the potentiometric amplifier $22b$ must, in this case, be respectively increased or reduced.

If it is desired to insert the capacitor 1 as a storage or measuring capacitor between two arbitrary potential points of a general network, care should be taken that the voltage reference point of the isolating amplifier $22a$ and the potentiometric amplifier $22b$ not be grounded.

If the value of $k$ is small, in the order of magnitude, for example, of $10^{-3}$, the potentiometric amplifier $22b$ assumes the function of an isolating amplifier. It is possible, in this case, to eliminate entirely the isolating amplifier $22a$ with the requirement, however, that the gain of the potentiometric amplifier be made positive.

The present invention has been described in terms of the time or transient response of the circuit embodiments. As has been shown, it is possible to achieve a 100% compensation of the charge losses in these circuits. Since the transient response of a network also directly describes, by way of Fourrier transformation, the frequency response thereof, the reactance of the real capacitor 1 in the circuits described, which arises by way of dielectric absorption losses, may be regarded as imaginary over a wide frequency range which is limited only by the amplifier elements employed. The real part of the reactance is effectively equalized.

The above discussion has concerned itself only with the capacitive losses which may be traced to dielectric absorption. The leakage losses described by the shunt resistor $R_p$ in the equivalent circuit of FIG. 1b has not been taken into account. These latter losses can also be neutralized in the circuits according to the present invention, however, if a resistor of value equal to the value of the shunt resistor $R_p$ in the equivalent circuit of the capacitor to be compensated is inserted in parallel with the compensating RC elements 21c of FIG. 3a and 22c of FIG. 4a.

A feedback circuit of the type suitable for compensating both the dielectric absorption and leakage losses is shown in FIG. 5. It is to be inserted instead of RC element 21c in FIG. 3a or instead of RC element 22c in FIG. 4a. This circuit 23c includes the RC element which corresponds to the dielectric absorption element 1a, in the circuits of FIGS. 2, 3a and 4a, as well as a resistor, in parallel therewith, which corresponds to the leakage loss resistor $R_p$ in the equivalent circuit of FIG. 1b.

It will be understood that the above description of the present invention is susceptible to various modifications, changes and adaptations, and the same are intended to be comprehended within the meaning and range of equivalents of the appended claims.

What is claimed is:
1. A circuit comprising, in combination:
   (a) a capacitor; and
   (b) means connected across said capacitor for substantially equalizing the losses in said capacitor produced by dielectric absorption, including means for detecting the capacitor voltage and for supplying said capacitor with current, the amplitude characteristic of said current being sufficient to equalize the voltage changes produced by said dielectric absorption, said means for supplying said capacitor with current including a two-terminal capacitor-resistor circuit having the same time constant as said voltage changes.

2. The circuit defined in claim 1, wherein said means for detecting the capacitor voltage includes means for applying a voltage to said capacitor-resistor circuit such that said current supplied to said capacitor will approximately equal the internal capacitor loss current produced by dielectric absorption.

3. The circuit defined in claim 2, wherein said means for detecting the capacitor voltage includes amplifier means connected to said capacitor and to said capacitor-resistor circuit.

4. The circuit defined in claim 3 wherein said amplifier means is connected between one terminal of said capacitor and one terminal of said capacitor-resistor circuit and wherein the other terminal of said capacitor is connected to the other terminal of said capacitor-resistor circuit.

5. The circuit defined in claim 1, further comprising an operational amplifier connected across said capacitor and wherein said equalizing means includes a phase-reversing amplifier having its input connected to the output of said operational amplifier, and a two-terminal resistor-capacitor circuit connected between the output of said phase-reversing amplifier, and the input of said operational amplifier, whereby said circuit is operative to integrate a voltage applied to said input of said operational amplifier.

6. The circuit defined in claim 5, wherein said two-terminal resistor-capacitor circuit includes a resistor and a capacitor in series.

7. The circuit defined in claim 5, wherein said two-terminal resistor-capacitor circuit includes a plurality of parallelly connected series circuits each comprising a resistor and a capacitor.

8. The circuit defined in claim 5, wherein said two-terminal resistor-capacitor circuit includes at least one series circuit having a resistor and a capacitor and connected in parallel with a resistor.

9. The circuit defined in claim 5, wherein said two-terminal resistor-capacitor circuit is chosen so as to equalize the dielectric absorption as well as the leakage losses of said capacitor.

10. The circuit defined in claim 1, wherein said equalizing means includes isolating amplifier means having an input terminal and an auxiliary terminal connected across said capacitor, potentiometric amplifier means having an input connected to the output of said isolating amplifier, and a two-terminal resistor-capacitor circuit connected between the output of said potentiometric amplifier and the said input of said isolating amplifier.

References Cited

UNITED STATES PATENTS

| | | | |
|---|---|---|---|
| 3,387,208 | 6/1968 | Foley | 324—60 |
| 3,421,077 | 1/1969 | Liu et al. | 324—61 |

J D MILLER, Primary Examiner

G. GOLDBERG, Assistant Examiner

U.S. Cl. X.R.

323—93; 324—60